April 11, 1961     E. M. WILLIAMS ET AL     2,979,639
PILOT PULSE SPARK MACHINING METHODS AND APPARATUS
Filed June 9, 1958     7 Sheets-Sheet 1

INVENTORS
EVERARD M. WILLIAMS
CECIL PAUL PORTERFIELD
by: Carlson, Pitzner, Hubbard & Wolfe
ATTYS.

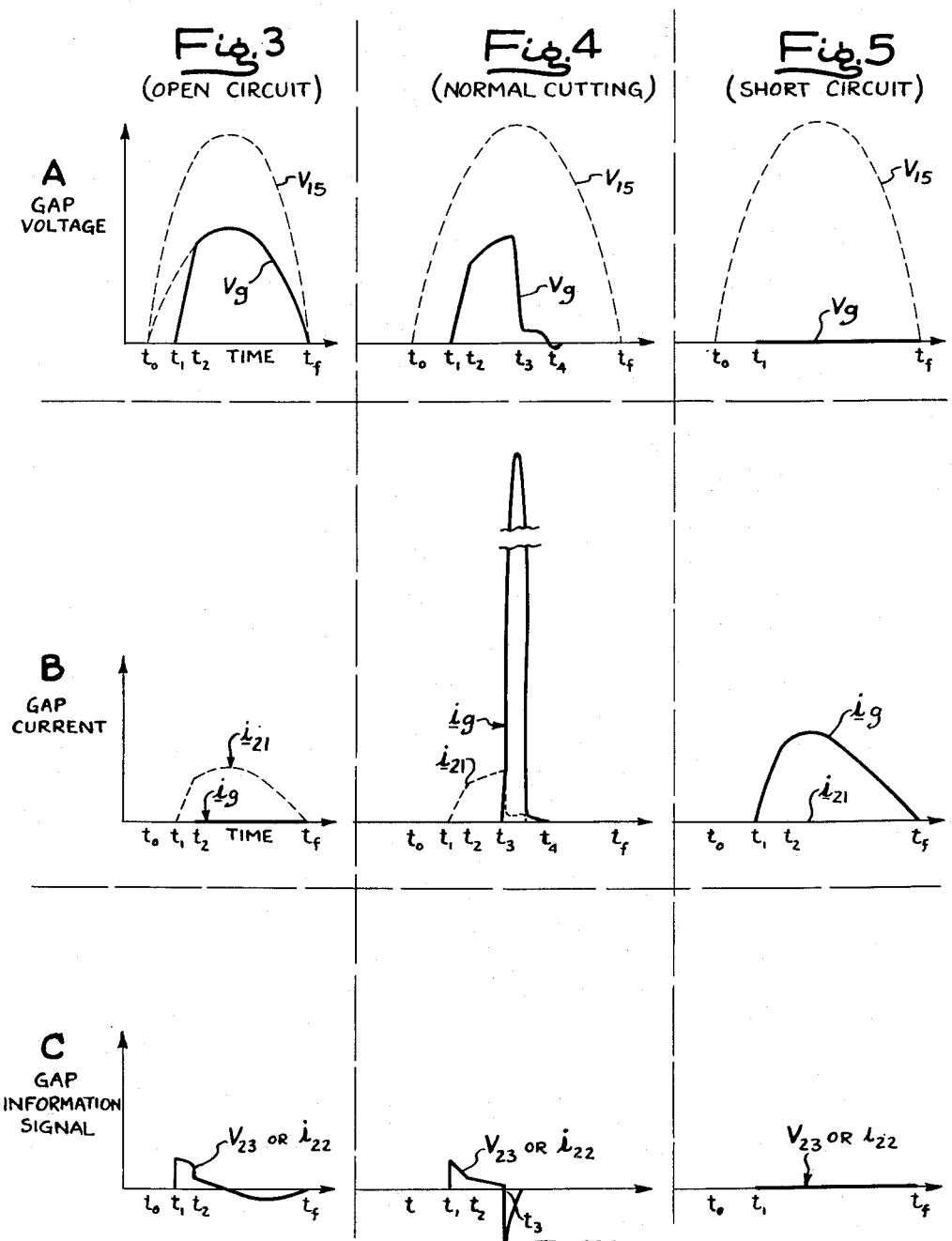

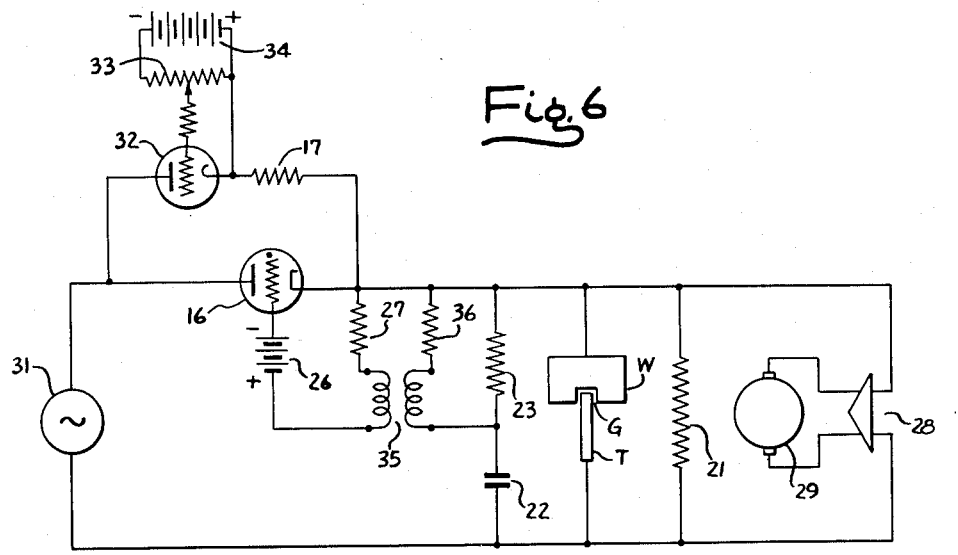
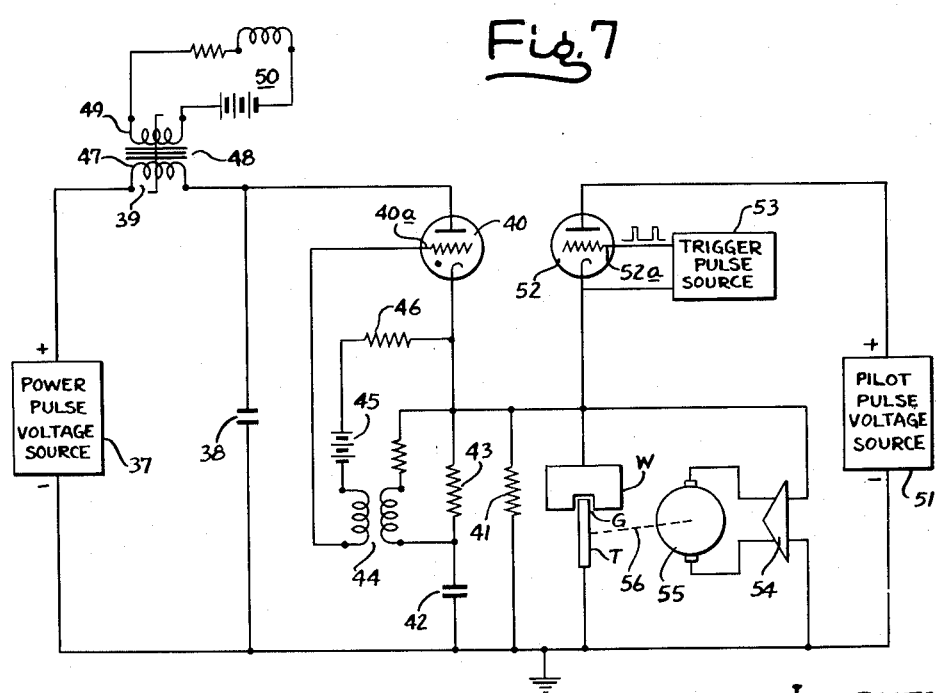

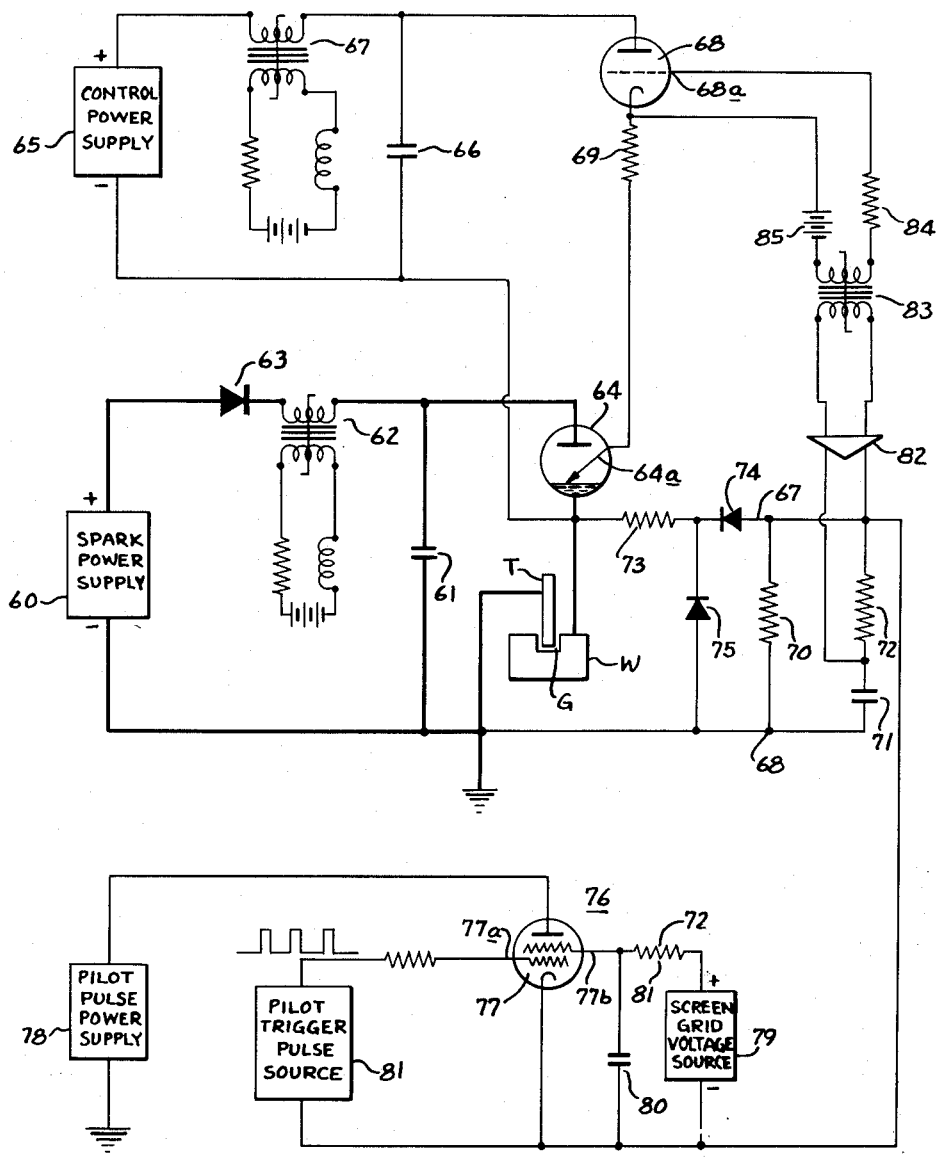

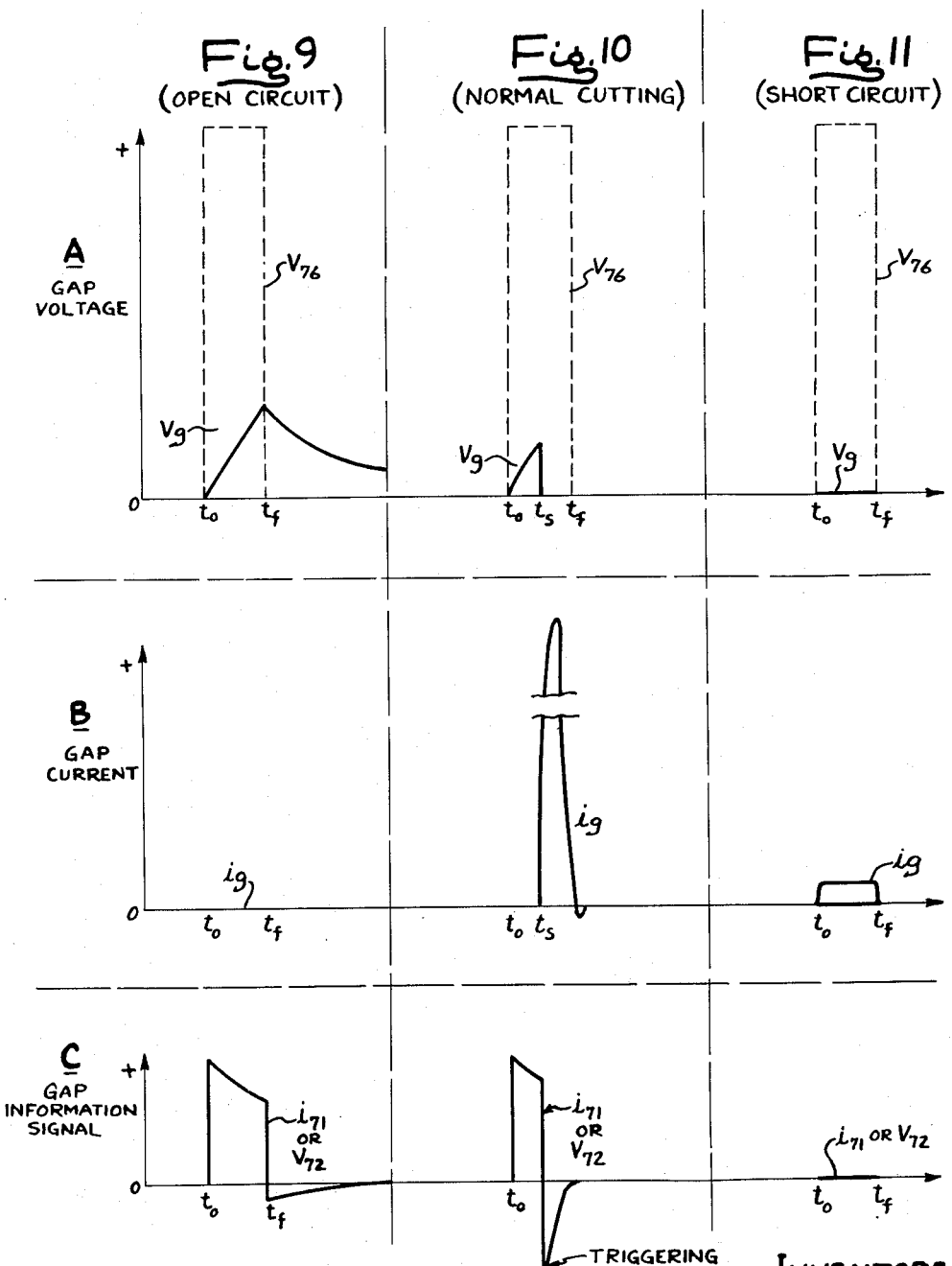

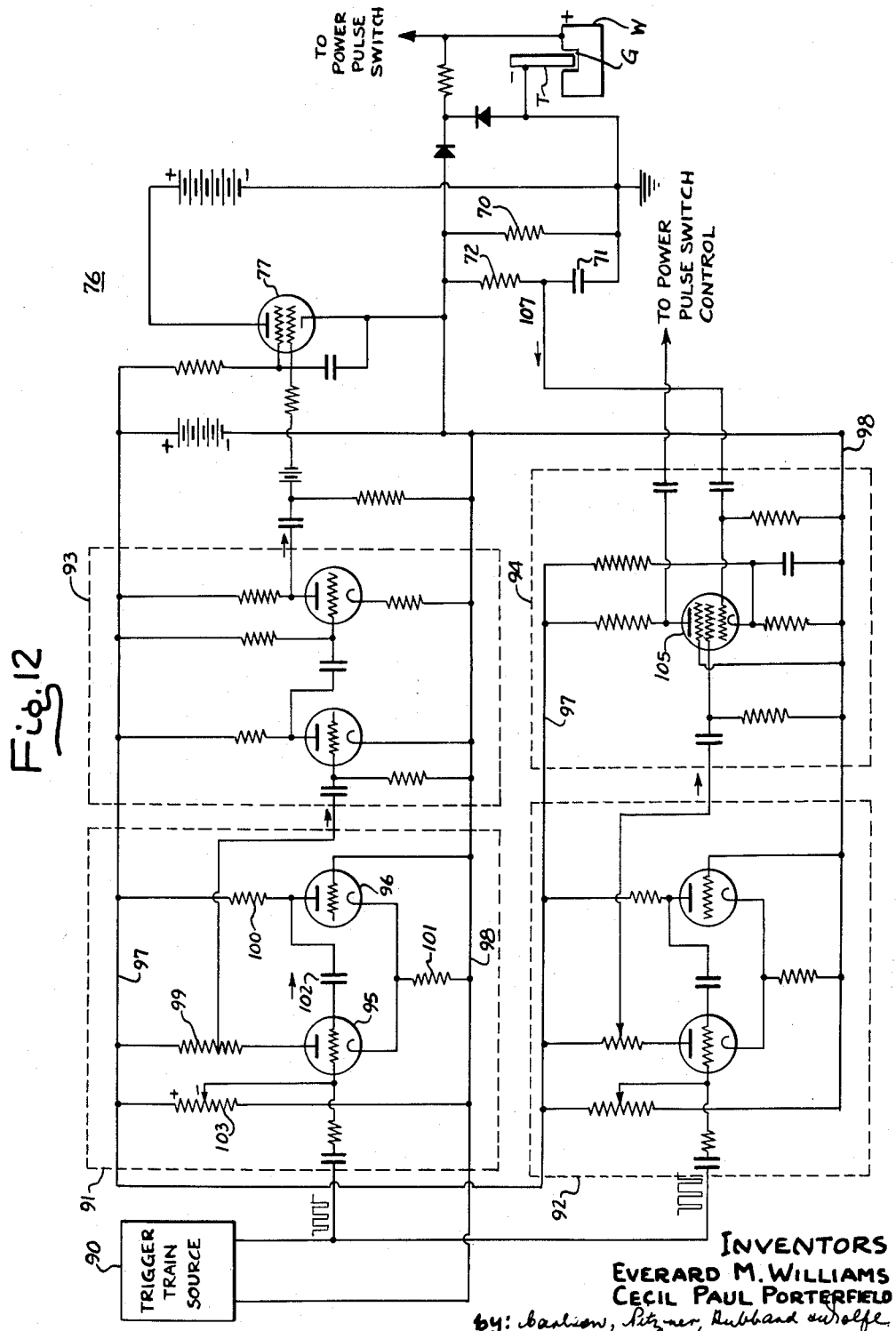

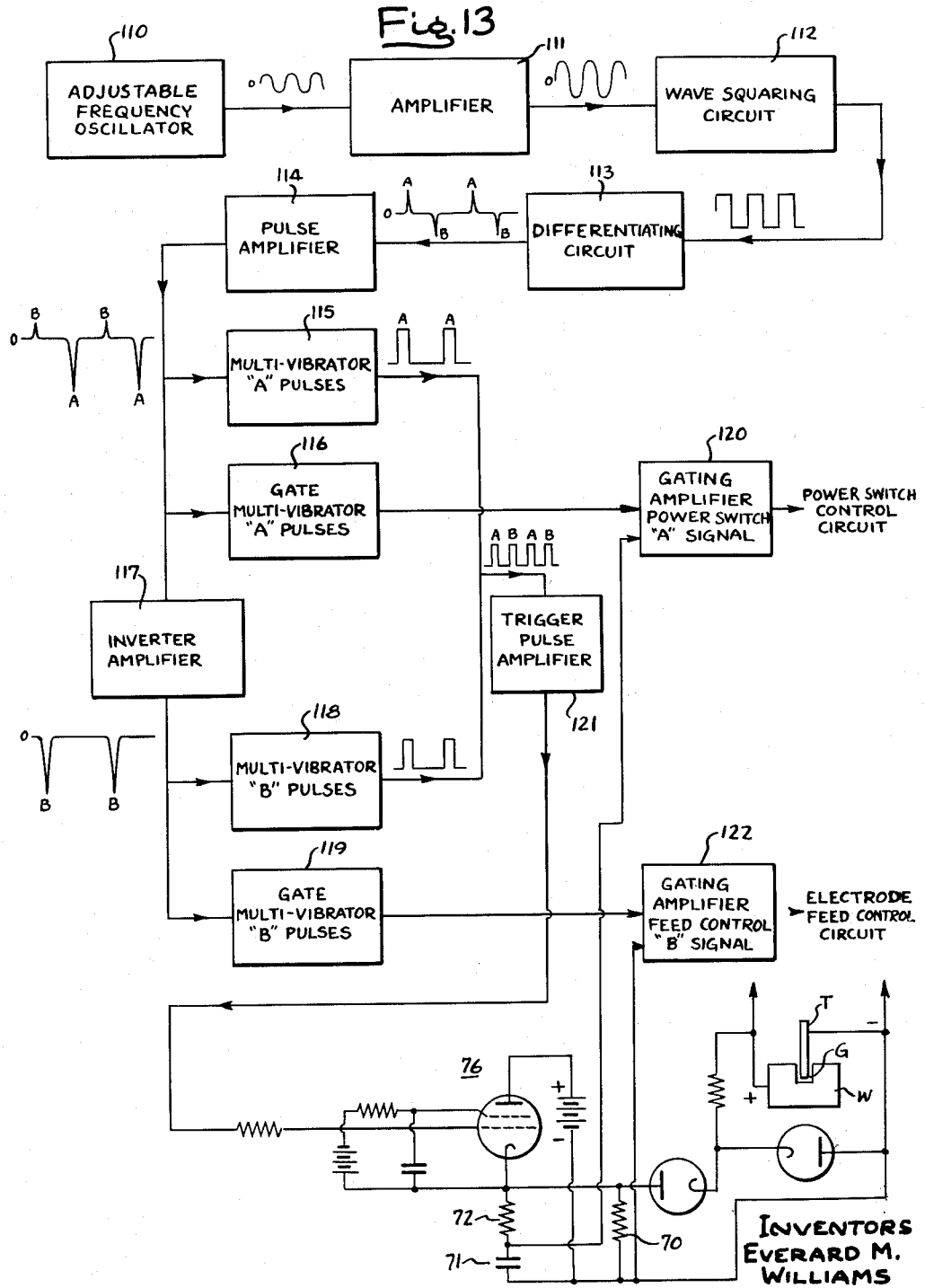

2,979,639

PILOT PULSE SPARK MACHINING METHODS AND APPARATUS

Everard M. Williams and Cecil Paul Porterfield, Pittsburgh, Pa., assignors to Firth Sterling Inc., Pittsburgh, Pa., a corporation of Pennsylvania Filed June 9, 1958, Ser. No. 740,763

19 Claims. (Cl. 315—127)

This invention relates to improvements in methods and apparatus in which particles of a conductive workpiece are removed by time-spaced, over-voltage initiated discharges across an ionizable fluid-filled spark gap defined between the workpiece and an electrode tool.

A general object of the invention is to circumvent restrictions in spark machining methods and apparatus design imposed by the usual interdependence of such parameters as pre-sparkover voltage, spark gap spacing, discharge duration and repetition rate, and the discharge power. For example, the spark gap spacing, which must be limited to low values—machining accuracy is one compelling reason—determines the maximum presparkover voltage which can be applied to the gap. The usual discharge power source is a capacitor which must be initially charged to the open circuit voltage. The energy available for the discharge is that stored in the capacitor or $\frac{1}{2}CV^2$ joules, in which C is capacitance in farads and V the open-circuit voltage. To increase the energy in the interests of higher power and higher cutting rates, the capacitance mus be increased. However, the discharge duration is determined by the product of the capacitance and the inductance of the discharge circuit. Assuming the inductance to be minimized, as it usually is, the increase of capacitance to obtain increase of discharge energy results in increased discharge duration rather than a higher discharge power. Increases in discharge duration are generally undesirable both because of resulting limitations on repetition rate (which thus limits the average power) and because there is a higher probability of thermal damage to workpieces when discharges are prolonged.

An attractive approach to higher power and removal rates is by increasing the capacitor voltage. Larger amount of stored energy can then be discharged in a short time at high current levels as generally desired for machining efficiency. In some types of apparatus the spark gap discharge path is connected directly across the capacitor with the result that the small gap spacings usually desired for machining accuracy permit sparkover before the capacitor is charged to a high voltage level. This problem is circumvented by the use of a switch effectively in series with the spark gap, which switch is closed after the storage means is charged. However, upon application of the high voltage to the gap, sparkover occurs at undesirably wide gap spacings as well as at smaller spacings. The presence of the high voltages of low impedance sources on the workpiece or electrode tool, especially during open circuit conditions when the gap spacing is too wide for sparkover, may also not meet operator safety requirements in the absence of expensive or production-limiting safeguards.

It is, therefore, a general object of the invention to restrict the range of gap spacing at which sparkover may occur while still using the high power spark machining discharges. It is a further object to utilize safety high voltage spark power sources.

The danger of welding the electrode tool and workpiece or of overheating the workpiece surface in the event of short circuiting of the gap is seriously aggravated at higher discharge currents. Such short circuiting is usually caused by the collection of dislodged conductive particles in the gap, or by too fast an advance of the electrode. On the other hand, if the electrode has advanced too slowly or has been withdrawn to clear a short circuiting condition so that the stored energy is not discharged across the gap, dissipation or internal discharge of the stored energy voltage should not result in apparatus damage or loss of electrode feed control.

It is, therefore, an important object of the invention to prevent the damaging effect of short circuits in spark machining. More particularly, it is an object of the invention to prevent damaging short circuit current flow, even in high power apparatus, without increasing the gap spacing for normal discharge or decreasing the normal discharge current. Stated in another way, it is an object of the invention to anticipate and avoid harmful effects of gap spacing which is greater or lesser than desired.

In spark machining apparatus, automatic electrode positioning means are commonly employed to adjust the gap spacing as the machining proceeds. Their speed and sensitivity are particularly important in "inside machining" applications in which a drill-like electrode advances into the workpiece with resulting stringent chip removal and precise electrode position requirements. Such systems sense the gap deviations from the normal spacing by the direction and extent of the departure of the average gap voltage or current or both from a desired normal level as the spark machining operation proceeds. It is desirable not only to prevent misfiring at any instant when the gap spacing is not correct, but also to restore the gap to the desired spacing as quickly as possible in order that the discharges may occur with minimum interruption.

It is, therefore, another object of the invention to sense spark gap spacing to derive both misfiring control and gap spacing control; it is an additional object to increase the effectiveness of electrode positioning control. It is a further object to provide an improved means for sensing the gap spacing prior to application of the stored power pulse across the spark gap.

Generally speaking, in accordance with certain aspects of the invention low-power pilot pulses are employed to sense the effective spacing of the spark gap and prevent the release of stored energy as a power pulse if the spark gap is short-circuited or too widely spaced. Only if the gap spacing is at the desired value as automatically ascertained by the pilot pulse parameters is the power pulse released for safe and efficient machining. In accordance with one feature of the invention, the ionized path of a low voltage pilot pulse spark may be employed to locate and initiate the sparkover path of a high voltage power pulse without releasing the power pulse at short circuit or wide gap spacing conditions. The pilot pulse energy source has a low level with respect to the workpiece, the apparatus, or the operator safety; the power pulse source is not connected to the gap unless and until the gap is ionized by sparkover so that the power pulse voltage is never developed across the gap. By another additional or alternative feature of the invention low-power pilot pulses provide gap information for the gap spacing control as well as for power pulse control to provide a more reliable and easily controlled electrical measure of the gap spacing than available during the periods of power pulse discharge.

Other objects and advantages of the invention will become apparent from the detailed description of the preferred embodiments disclosed in the accompanying drawings, in which.

Figure 2:
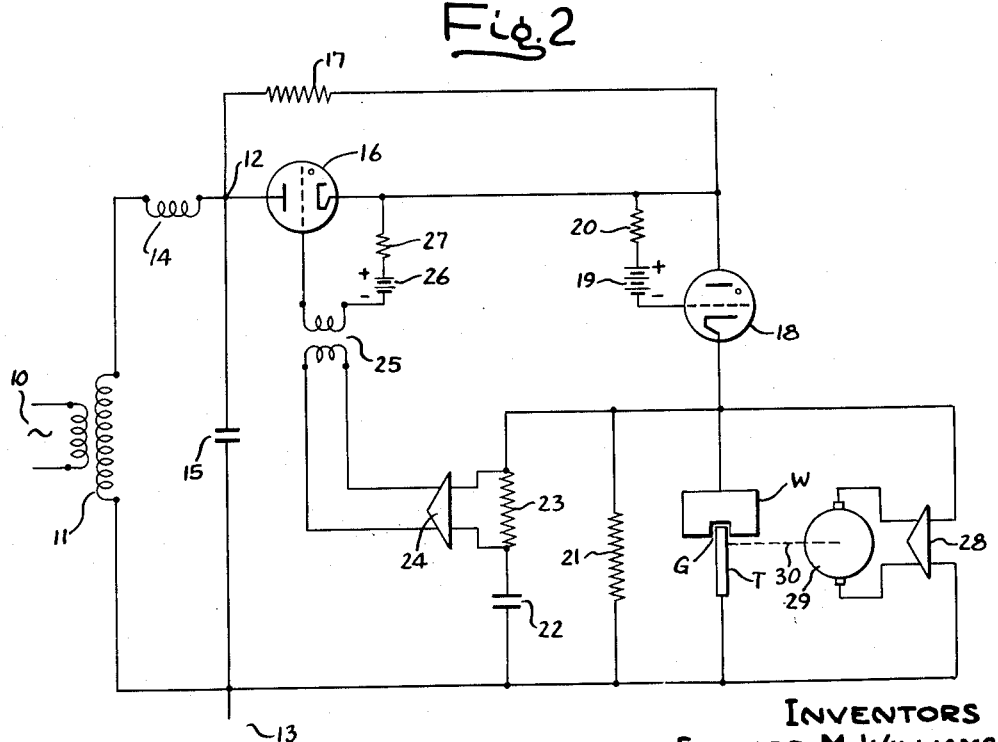
Fig. 2 is a circuit diagram of one form of apparatus embodying the invention in which the pilot pulse is derived directly from the power source without a triggering switch.

Figs. 3, 4, and 5 illustrate the gap voltage, gap current and the gap information signal in parts A, B, and C of each figure, the figures respectively representing open circuit, normal cutting, and short circuit spacing of the spark gap in the apparatus of Fig. 2.

Fig. 6 represents a modification of the apparatus of Fig. 2.

Fig. 7 is a circuit diagram of another form of apparatus embodying the invention in which an independent pilot pulse means determines the repetition rate of the power pulses.

Fig. 8 represents a modification of the apparatus of Fig. 7 especially adapted for very high power requirements.

Figs. 9, 10, and 11 illustrate the gap voltage, gap current, and gap information signal in parts A, B, and C of each figure, the figures repectively representing open circuit, normal cutting, and short circuit spacing of the spark gap in the apparatus of Fig. 8.

Fig. 12 illustrates particularly a pilot pulse source for providing square wave pilot pulses in the apparatus of Fig. 8.

Fig. 13 illustrates another pilot pulse source for use with the apparatus of Fig. 8 in which separate pulses are employed for power pulse switching and electrode feed control.

While the invention is susceptible of various modifications and alternative constructions, we have shown in the drawings and will herein be described in detail the preferred embodiments, but it is to be understood that we do not thereby intend to limit the invention to the specific form disclosed, but intend to cover all modifications, alternative constructions and equivalents falling within the spirit and scope of the invention as expressed in the appended claims.

*General considerations*

In the circuits about to be explained, it will be understood that the spark gap defined between a conductive workpiece and an electrode tool may take many forms but still retains its distinctive electrical characteristics. The spark gap spacing is desirably quite small, suitably in the vicinity of a few thousandths of an inch and inundated or otherwise flooded with a self-restoring ionizable fluid or semi-solid. This material is termed a dielectric since the large currents follow a spark-over or overvoltage initiated discharge through it. The ionized path created upon spark-over is practically a short circuit compared with the high resistivity of the material considered as an electrolyte. Kerosene, as an example of a commonly used fluid, is often used both for its electrical characteristics and because it serves well the mechanical function of removing the dislodged conductive material from the active spark gap area. Typically each discharge is a single pulse a few microseconds in time duration at currents which may range up to several thousand amperes. Upon breakdown the ionized gap tends to limit the voltage drop to 20 to 30 volts despite changes in the gap length or in the gap current. The gap thus does not present a constant resistance which can be matched by the voltage source.

The schematic showing of a tubular electrode T boring a hole in a workpiece W (as in Fig. 2) illustrates a typical machining spark gap G in which the present invention is significantly employed. Dislodged particles at the bottom or sides of the bore may cause damaging short-circuit current or false indications of the actual spacing at the bottom of the bore as sensed by the gap voltage or current. The electrode-feed mechanism must be operative as the bore is formed to maintain neither more nor less than the small desired spacing and thus avoid a high occurrence either of workpiece-damaging short circuit discharges or time-wasting open circuit periods.

Figure 1:
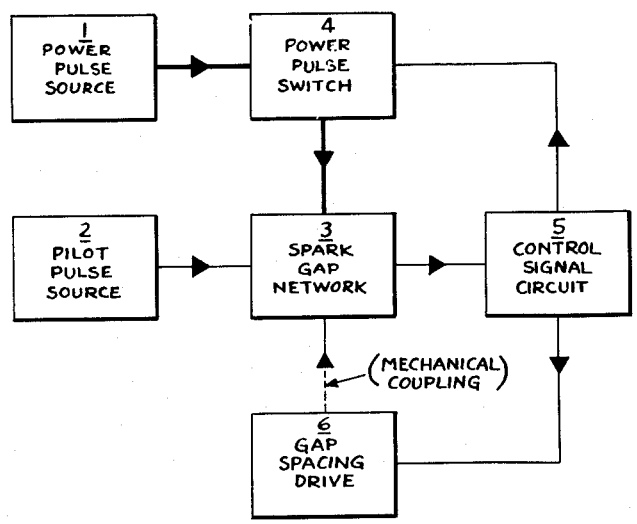
Figure 1 is a block diagram illustrating generally the functional arrangement of apparatus embodying the invention.

In each of the following circuits a power pulse is released only if a low power or pilot pulse indicates that the gap conditions are correct for useful discharge. For this purpose, as shown in Fig. 1, the functional parts of the circuit may be referred to as pilot pulse and power pulse sources 1 and 2, whether separately or commonly derived, a gap information network 3 including the spark gap itself, a power pulse discharge switch 4 operable only when the gap is properly spaced in response to a control signal, and a control circuit 5 for supplying a signal derived from the gap network to the switch 4. An automatic electrode feed control means 6, is also operated from the control circuit 5 required for moving the electrode T relative to the workpiece W in a direction and at a rate corresponding to the control signal and amplitude of an electrical signal derived from the gap network. The actual mechanical moving means and linkage whether, for example, by electric motor or hydraulic actuation, are not the subject of the present invention apart from the electrical input control means.

*The circuit of Fig. 2*

Turning now to Fig. 2, the embodiment there shown utilizes the frequency of an alternating-current power source as the pilot frequency, thus removing the necessity for separate control of the pilot pulse frequency. As shown therein, an alternating frequency power source 10 suitably has its voltage stepped up through its transformer 11 and presented at terminals 12 and 13, terminal 13 suitably being the common or ground terminal for the apparatus. An inductance 14 or other charging impedance is inserted in series with the lead to terminal 12. An energy storage means, suitably and economically a capacitor 15 is connected between terminals 12 and 13. The charging impedance prevents direct application of the capacitor-charging voltage source to the discharge circuit. It will be appreciated that both in this and the other embodiments described, the energy storage means may take forms more complex than the simple capacitor, such as, for example, inductance-capacitance pulse forming networks.

In accordance with the invention part of the discharge circuit between terminals 12 and 13 is provided with alternate paths—one is the power pulse path through a switching device 16 of a type having a control electrode, and the other is the pilot pulse path through a current-limiting means 17 shunting the device 16. The switching device 16 is preferably a thyratron or an ignitron to provide a very low impedance to the flow of high discharge currents through it at such times as the terminal 12 is positive with respect to ground and its grid electrode is driven sufficiently in the positive direction to initiate conduction. A resistor as the means 17 limits current flow through it to sufficiently low values to prevent damage to the workpiece W in the event of short circuit.

While an independent triggering means for the pilot pulse is not necessarily required here since an alternating power source is employed, a gaseous discharge device 18, suitably a thyratron, cooperates with the resistor 17 as a rectifier to pass only the positive pulses from the alternating source. Thus, discharge current can flow only when the terminal 12 is positive with respect to ground. The thyratron 18 is necessarily in series with the pilot-pulse resistor 17, and in this instance is also in series with the power pulse switching device 16. The pilot pulse is also provided with a more steeply rising voltage front than defined by the full half wave in view of the sudden breakdown upon ionization of the gaseous discharge device 18. While firing may be delayed with a diode as well as with a triode, the grid electrode of the thyratron device 18 is advantageously adjustably biased to set the firing time somewhere near the peak of the positive half wave voltage. Toward this end a D.C. bias source 19, represented as a battery, and a grid current limiting resistor 20 are connected between the anode and grid of the thyratron 18.

The spark gap G completes the discharge circuit, as a very low impedance, during normal machining discharge. It is shunted by a gap resistor 21, which, with the resistor 17 divides the source voltage in the event the gap spacing is too large for discharge to occur. The current through resistor 21 serves a useful function in establishing the potential across the switching device 16 prior to its discharge. With the resistor 17 it provides a path for discharging only a part of the energy of capacitor 15 in the event that no sparkover discharge occurs.

To provide a useful control of the power switch from the information derived by the pilot pulse, the gap network is completed by a capacitor 22 and a resistor 23 connected in series to shunt both the gap G and the gap resistor 21. The voltage appearing across resistor 23 is differentiated with respect to the voltage appearing across the gap as subsequently explained. The voltage appearing across resistor 23 is desirably first amplified in an amplifier 24 having its input terminals connected across the resistor 23. The amplified signal is introduced into the grid circuit of the switch 16 by a transformer 25 having its primary winding connected across the amplifier output terminals. The voltage appearing across the transformer secondary winding is thus readily isolated and inverted.

As further indicated by Fig. 2 the secondary winding is connected between the grid and cathode of device 16 in series with a source of voltage bias 26, which maintains the grid sufficiently negative to prevent conduction in the absence of a positive-going control signal, together with a grid current-limiting resistor 27. It will be appreciated that the functions of the amplifier 24 and transformer 25 may be variously combined or performed, the objective being to provide a signal of the required polarity and suitably isolated with respect to the voltage appearing across resistor 23.

An electrode tool drive system is also responsive to a voltage of the gap network. As shown, this drive utilizes an amplifying system 28 having its input terminals connected across the gap and its output terminals connected to a reversible motor 29. A mechanical coupling 30 between the motor and electrode T increases or decreases the gap in accordance with the direction and speed of the motor.

*Operation of the apparatus of Fig. 2*

The electrical signal derived from the passive gap network upon application of the pilot pulse through the resistor 17 and thyratron 18 yields usable information about the gap spacing. A relatively large signal value of a given polarity is reliably provided during normal spark cutting gap conditions and not during either short circuit or open circuit conditions.

Figs. 3, 4 and 5 illustrate voltage and current conditions in the gap network during respectively open circuit, normal cutting circuit, and short circuit conditions. Parts A, B, and C of each of these figures illustrate respectively the gap voltage, the discharge current, and the gap information signal.

Until sparkover occurs, the source voltage $V_{15}$ (V representing voltage and the subscript representing the circuit element of that number in Fig. 2) is divided according to the ratio of the resistances $R_{17}$ and $R_{21}$. Thus, prior to sparkover the gap voltage $V_g$ may be expressed as follows:

$$V_g = \frac{R_{21}}{R_{17}+R_{21}} \times V_{15}$$

The grid bias on thyratron 18 prevents application of any part of the voltage $V_{15}$ until the thyratron has fired, thus providing a shorter applied pulse of steeper wave front.

With typical spark machining spacings considered as less than 0.001 inch, breakdown or sparkover voltages of the order of 50 to 100 volts are usually employed. It is generally desirable that the voltage is sufficient to cause sparkover during the early part of the applied pulse before it has reached its peak value. The set of values used in one demonstration of the apparatus of Fig. 2 resulted in a peak value of $V_{15}$ equal to 1200 volts from a 400 cycles per second power source 10. With $R_{17}$ and $R_{21}$ each equal to 60 ohms, the peak voltage appearing across the gap is 600 volts. By setting the grid bias on thyratron 18 to permit firing at 180 volts across the thyratron, one half of this value or approximately 90 volts is abruptly applied across the gap during an early portion of the voltage half cycle.

If the gap is correctly spaced, breakdown occurs quickly, well before the applied pulse has reached its peak. Of course, upon sparkover, with the spark gap acting practically as a short circuit, the voltage and current relationships change and in a distinct manner. With this brief description of typical conditions illustrating the manner of the normal cutting gap, reference may be made to the figures for a further analysis.

(a) *Open circuit.*—Fig. 3A illustrates the gap voltage during one of the applied pulses. The dotted curve $V_{15}$ represents a positive half of a sine wave appearing as the source voltage across capacitor 15 starting at time $t_0$ and ending at time $t_f$. The solid curve $V_g$ is the gap voltage, which, in the absence of sparkover, divides according to the ratio of the resistors $R_{17}$ and $R_{21}$ as previously described. The curve $V_g$ is a sine wave except for the leading portion which begins not at time $t_0$ with the source voltage $V_{15}$ but at a later time $t_1$, whereupon the gap voltage rises rapidly until time $t_2$ wehre it reaches the sine wave envelope of $V_g$.

The gap voltage does not rise immediately at time $t_1$ to the full sine wave value because energy is required to initially charge the capacitor 22 in the gap network by current through the combined resistances $R_{17}$ and $R_{23}$. $R_{23}$ is desirably small with respect to either $R_{17}$ or $R_{21}$, and hence the charging time constant does not prevent the rapid charging of the capacitor 22 during an early part of the applied pilot pulse.

Fig. 3B shows the current relationships. There is no gap current $i_g$ because there is no sparkover. The dotted outline marked $i_{21}$ is the current through gap resistor 21 starting at time $t_1$ and following the voltage $V_g$ across the gap. This current approximates $$\frac{V_g}{R_{21}}$$

The solid line curve $i_{22}$ in Fig. 3C represents the charge and discharge current of capacitor 22. This current rises immediately at $t_1$ to a maximum value and declines to a lower value at time $t_2$. After time $t_2$ the capacitor voltage closely follows the gap voltage, a small capacitor charging current flowing as the gap voltage increases and a small capacitor discharging current flowing as the gap voltage decreases from the peak of the voltage pulse to time $t_f$. The intersection of the $i_{21}$ curve with the horizontal axis in Fig. 2B marks the gradual change from charging to discharging current. The capacitor thus discharges through the combined value of resistors 21 and 23 to leave the capacitor in readiness for the next pilot pulse.

The voltage $V_{23}$ across the resistor 23 is the voltage drop due to the capacitor current $i_{22}$ of Fig. 3C and hence has the same shape. Accordingly, the same curve represents both $V_{23}$ and $i_{22}$ and is termed the gap information signal. The signal polarity in Fig. 3C (and the same applies to Figs. 4C and 5C) must be negative-going to produce a positive-going pulse on the control grid of the power pulse switching thyratron 16. During the open circuit conditions of Fig. 3C the only negative-going voltage across resistor 23 is a low-level and gradually changing voltage which is insufficient to induce a control grid signal and no power pulse is released.

(b) *Normal cutting.*—During normal cutting the voltage $V_g$ across the gap, as shown in Fig. 4A, initially proceeds as in the open circuit condition. However, with the gap spacing sufficiently small breakdown occurs at time $t_3$ normally between time $t_2$ and the instant at which the peak voltage would occur. (It is possible but not probable that the discharge would occur after the voltage $V_g$ had passed its peak.) At time $t_3$ the voltage curve $V_g$ drops rapidly to a value of around 20 volts, the ionization voltage of the gap. This voltage persists until the capacitor is discharged at time $t_4$, and an oscillatory tendency due to the inclusion of distributed inductance in the capacitor discharge circuit usually cuts off the pulse before the time $t_t$.

The current through gap resistor 21 in Fig. 4B follows the curve $i_{21}$ of Fig. 3B until the time of sparkover $t_3$. Thereupon the current $i_g$ flows directly across the gap as the thyratron 16 is switched on and the resistor 17 is essentially short circuited. The spike representing the current pulse does not approach a scaled drawing; the magnitude of the current instead approaches that of a short circuit across the charged capacitor 15.

The manner in which the power pulse 16 is switched on may be appreciated by further reference to Figs. 4B and 4C. The information signal of Fig. 4C (current in the gap capacitor 22 and the voltage across its associated resistor 23) corresponds to that of Fig. 3C during open circuit conditions until time $t_3$ when sparkover occurs. Immediately upon sparkover, the gap voltage $V_g$ drops to the low ionization level of the spark gap and the capacitor 22 discharges at a rapid rate through the relatively low resistance of resistor 23 and the ionized gap. This discharge time constant is much shorter than that provided in the much higher combined resistance of resistor 23 and the gap resistor 21.

This sudden discharge of the capacitor due to breakdown of the gap has important consequences. As shown in Fig. 4C the voltage across the resistor 23 at time $t_3$ follows the gap capacitor discharge current pattern—a sharp spike or pulse. This pulse, suitably amplified by amplifier 24 and induced by transformer 25 into the grid circuit of the power pulse switch immediately renders the switch conductive so that the power pulse of Fig. 4B is initiated.

(c) *Short circuit.*—The acid test of the control system is its behavior during short circuit. The operation is simple as indicated in Figs. 5A, 5B, and 5C. Since the presence of the short circuit shunts the gap network, the entire pilot pulse voltage appears across the resistor 17, which limits the current flow. Since no gap voltage appears during short circuit, no charging voltage can appear across capacitor 22. As shown in Fig. 5B the gap current $i_g$ is simply $$\frac{V_{15}}{R_{17}}$$

and is shown as sinusoidal after time $t_1$ (assuming that the capacitor 15 is not appreciably discharged by this amount of current). There is no appreciable amount of current $i_{21}$ through resistor 21. As shown in Fig. 5C the absence of any charging or discharging current in the capacitor 22 means that no voltage can appear across resistor 23 and hence no signal occurs to turn on the power pulse switch 16.

Fig. 5C simply confirms the fact that the gap information signal remains zero when the gap capacitor is neither charged nor discharged.

It will be appreciated from the foregoing that the sharp spike represented by the differentiated voltage appearing across resistor 23 of the RC network represented by that resistor and capacitor 22 provides a very stable and reliable control. The operating control signal during normal cutting is greater in amplitude than either the short circuit signal on the one hand and the open circuit signal on the other hand. Only in the event that short circuit occurs after the beginning of a pilot pulse, when the gap capacitor is already charged, can the power pulse current flow through a short circuit, and even then the power pulse switch is not closed during the succeeding pulse periods if the short circuit persists. In no event does the control rely upon an averaging of voltage or current over successive pulses, and no comparison with a preset reference signal is involved.

(d) *Electrode feed.*—Without detailing the particular amplifying or circuit means for the electrode feed system, it will be appreciated that an input voltage for an amplifier 28 of Fig. 2 is provided by the gap voltage $V_9$ as averaged over several pulse periods. The time averaging may be performed electrically or it may be provided by the inertia of the mechanical drive components. When the gap spacing is so large as to result in open circuit operation the gap voltage $V_9$ is relatively high (Fig. 3A). At short circuit the gap voltage $V_9$ is zero (Fig. 5A). During normal cutting the gap voltage has an intermediate average value due to the drop in voltage upon sparkover (Fig. 4A). The voltage range is not adversely affected by the use of the network for deriving a power switch control signal.

Accordingly, by comparing the average gap voltage with a reference voltage corresponding to the average gap voltage for normal cutting, a direct current error signal varying in amplitude and sign with the departure of the gap spacing from that required for normal cutting, is obtained as a feed-back signal. This signal is applied to amplifier 23 which controls the reversible tool feed motor 29. Ideally, the electrode tool T advances at exactly the rate the material is removed from the workpiece W in the path of the tool, but short circuit conditions occur due either to difficulty of precise follow-up or the accumulation of conductive debris.

The selection of the reference voltage for setting the drive feed should, of course, tend to maintain the gap within the normal cutting range bounded by the pilot pulse open circuit and short circuit limits, respectively. In the particular example mentioned the electrode feed has been advantageously set to crowd the short circuit limit rather than open circuit limit, using the pilot pulse circuit principally for avoidance of short circuit damage and using the electrode feed to reduce wide-spacing discharges. In any event, limiting of the range of gap spacing for cutting and avoiding waste of pulse periods may be balanced by taking advantage of the separate adjustment of the pilot pulse boundary voltages and the electrode feed reference voltage.

*Modified apparatus of Fig. 6*

Various modifications of the apparatus of Fig. 2 may be made. For example, it has been found to operate satisfactorily to prevent application of the power pulse during short circuits with the thyratron 18 of the Fig. 2 circuit removed. Under such conditions, the pilot pulse is sinusoidal, unless the power source is modified. With such an arrangement, the simple electrode feed system is disabled since the averaged alternating voltage across the gap becomes zero, or near zero.

The modification represented by Fig. 6 has elements corresponding to those of Fig. 2 as indicated by the similar lettering. The voltage source is replaced by a general representation of an alternator 31 and the thyratron 18 is omitted. In place of the latter a rectifying device 32 is connected in series with the pilot resistor 17, the series combination shunting the power pulse switch 16. Such a rectifying device need pass only the pilot pulse current and may have a considerably smaller rating than the power pulse switch 16. As shown in this instance a vacuum triode is employed which itself has sufficient initial resistance so that the resistor 17 may be dispensed with if the tube rating permits.

To vary the pilot pulse magnitude in accordance with the desired range of operation the bias of the grid of the triode 32 may be adjusted. As shown, a voltage divider is provided by a resistor 33 connected across a source of bias voltage 34. One end of the resistor is connected to the cathode and an adjustable tap on the resistor is connected to the grid. With such an arrangement the voltage across the gap, except for possible very short-time transient conditions, is limited to pulses of one polarity, thus facilitating use of the type of electrode feed control described. The operation of this circuit is essentially the same as that described in connection with Fig. 2.

By way of further illustration, the information signal amplifier 24 is omitted, the signal being induced directly in the grid circuit of switch 16 by transformer 27. A resistor 36 in series with the primary winding of transformer 35 is desirably employed if the winding does not itself have sufficient resistance to damp any oscillations in the gap network introduced by the transformer inductance. The net resistance in series with capacitor 22 and shunting resistor 23 should be low. This assures that the capacitor 22 can be sufficiently charged during an early part of the pilot pulse to provide a switch-operating signal upon sparkover during the later part of the applied pulse.

*Apparatus of Fig. 7*

While the circuits thus far described may be designed to cover a range of conditions, the use of very high power spark cutting circuits is facilitated by further separating the power pulse and pilot pulse sources. One objective in so doing is to obtain a greater ratio between the power pulse current and the pilot pulse current; another is to meet the problems of pulse forming and switching at greatly differing power levels.

The apparatus of Fig. 7 illustrates a circuit in which the direct current supply is advantageously employed for the power pulse voltage with the repetition rate controlled in the low power pilot pulse circuit. As shown therein a direct current voltage source 37 is employed as the power pulse supply. Such a supply may be derived from the available frequency shop supply with full wave rectification, and may advantageously be of a capacitor output type in which a large value capacitance is included across the output terminals of the supply. Such a supply is used to charge in turn a storage capacitor 38 of the spark powering circuit through a magnetic switch 39. The discharge circuit for the capacitor 38 includes a discharge device switch 40 having high current carrying capacity. The discharge circuit is completed by the workpiece W and electrode tool T defining the gap G between them, the workpiece being connected to the cathode of the switch 40 and the electrode tool being returned to the power supply negative terminal which is conveniently the ground or common potential terminal for the apparatus. A gap resistor 41 and an RC (resistance-capacitance) circuit comprising a resistor 43 and capacitor 42 connected in series across the gap to shunt the gap resistor 41 complete the gap information signal-deriving network.

As in the apparatus of Fig. 2 means are provided for applying the sudden voltage change appearing across the resistor 42 as a reliable voltage spike or pulse for triggering control electrode 40a of the switch 40 upon sparkover. For this purpose transformer 44, grid bias voltage source 45 and grid limiting resistor 46, similar to elements 25, 26, and 27 in the circuit of Fig. 2, apply the voltage appearing across the resistor 43 to the grid 40a with the necessary isolation and polarization. With such a power pulse circuit the discharge of the capacitor 38 upon closing of the switch 40 provides a short high current pulse in the discharge circuit.

The magnetic switching device 39 prevents direct connection of the direct current power supply 37 to the gap. The particular arrangement shown, which is more fully described and claimed in the copending application of Cecil P. Porterfield, S.N. 726,983, filed April 7, 1958, and assigned to the assignee of the present invention, has the main or primary winding 47 of the saturable core magnetic switching device 39 in series in the charging circuit between the direct current power supply 37 and the capacitor 38. Its saturable core 48, which core is preferably of a material having a substantially rectangular hysteresis loop, is also linked by a control or secondary winding 49 which is energized by a direct current supply 50 to maintain a steady bias excitation component for resetting the saturable core after discharge of the capacitor 38. After the time delay required for the voltage source to saturate or switch the core following discharge of the capacitor, the capacitor 38 is rapidly charged in readiness for the next application of a trigger voltage to the switch starting electrode 40a. The delay time in effect holds off the source voltage from the capacitor while the tube is deionized following discharge. Simple reactors, resistors, or both may also be employed without departing from the present invention, depending in part upon the frequency involved, the deionization time of the switch 40, and the extent to which the oscillatory tendency due to distributed inductance in the discharge circuit helps to snuff out the discharge device switch 40 after the initial discharge impulse.

Referring now further to the features of the present invention, a separate pilot pulse direct current voltage supply 51 is also illustrated in Fig. 7. It is connected through a pilot pulse switch 52 to the spark gap and spark gap network. As shown, the supply negative terminal is connected to ground and the positive terminal is connected to the anode of the switch 52 whose cathode in turn is connected to the workpiece W. The switch 52 is preferably a gaseous device such as a thyratron having a control electrode 52a. It should be appreciated of course that the reference to gaseous discharge devices, also called soft tubes, includes mercury-pool or mercury-vapor tubes as well as tubes filled with such gases as xenon or hydrogen. A separate trigger pulse source 53, which may be any suitable generator and which is preferably adjustable in frequency, is connected between the control electrode 52a and the cathode of the pilot switch 52 to periodically render the switch conductive.

An electrode feed system corresponding to that of Fig. 2 is also shown as comprising an amplifier 54 having its input terminals connected across the gap G, a motor 55 controlled by the amplifier, and a drive linkage 56 to the electrode T.

The operation of the circuit corresponds generally to that explained in connection with the apparatus of Fig. 2. The pilot pulse voltage source 47 is adjusted to the desired pilot pulse voltage for the spacing sought to be maintained. Typically it is many times lower than the power pulse voltage appearing across capacitor 36. It will be appreciated that the frequency of the relatively low power trigger pulse source 49 can be readily adjusted and it is this frequency which determines, during normal spark cutting conditions, the repetition rate of the power pulses. The pilot pulse system, separated as it is from the power pulse system, can also be more readily adjusted to narrow the range of operation.

*The apparatus of Fig. 8*

Further modifications of the circuit of Fig. 7 making possible closer control of the system may be realized in such circuits as that illustrated in Fig. 8, in which particular pains are also taken to prevent the transient conditions normally accompanying the rapid and large current changes in the discharge circuit during a high power discharge from affecting the reliability of the low power pilot pulse and signal deriving circuits.

Thus as shown in Fig. 8 the power circuit comprises a direct current spark power supply 60 which charges a main storage capacitor 61 through a magnetic switching reactor 62 and a rectifier 63. The charging circuit is not the subject of the present invention and has been previously described. A discharge switch 64 is shown as mercury-pool ignitron with a starting electrode 64a. Such a device is one of the few commercially available switches which can be fairly rapidly deionized and which can handle the high peak currents, often many thousands of amperes, at substantial frequencies. The spark gap G completes the discharge circuit, and as previously shown, the electrode tool T is connected to the machine ground (also the negative terminal of the spark power supply 60) while the workpiece W is connected to the cathode of the switch 64.

A control circuit for starting the ignitron has its own direct current power supply 65 (not grounded) which charges a control circuit storage capacitor 66 through a suitable charging impedance or magnetic switch 67. The capacitor 66 is discharged through a switching device 68, preferably a thyratron because it is ionizable to conduct high currents and can be quite rapidly deionized, and through the starting circuit of the ignitron 64. As shown, the igniter starter 64a is connected through a current limiting resistor 69 to the cathode of the thyratron 68, and the mercury-pool of the ignitron is returned to the negative side of the control storage capacitor 66. It will be appreciated that when a sufficiently positive-going pulse is applied to the control electrode 68a of the thyratron 68, the capacitor 66 rapidly discharges through the thyratron and the starting electrode of the ignitron to ionize the ignitron and initiate the discharge of the capacitor 61 through the ignitron and the spark gap.

A gap information network similar to that previously described is also employed but in such manner as to forestall interference with the information signal by the power pulse. Thus a gap resistor 70 is effectively connected across the gap G and is shunted by a series RC circuit consisting of a gap capacitor 71 and resistor 72. A damping resistor 73 and diode rectifier 74 are inserted in series between the workpiece W and the positive side of the network, the other side of the network being directly connected to ground, which is the negative or electrode tool side of the gap G. Rectifier 74 is polarized to permit gap capacitor 71 to discharge through the gap G and to block capacitor charging current flow from the positive workpiece W. A damping rectifier 75 across the information network shunts reverse or oscillatory currents in the event the workpiece becomes momentarily negative with respect to ground. For this purpose the anode of rectifier 75 is connected to ground (the normally negative electrode tool side of the gap) and the cathode is suitably connected to the juncture of damping resistor 73 and blocking rectifier 74.

In order to introduce the pilot pulses into the gap information network as thus unidirectionally isolated from the gap G, a separate pulse generator 76 is preferably employed. For this purpose a discharge device 77, suitably a beam power tetrode, or several such tubes connected in parallel, has its anode connected to a direct current source 78 which is positive with respect to the machine ground. This may also suitably be the positive terminal of the main grounded spark power supply 60 or a tap thereon. The cathode of tube 77 is connected to the positive (ungrounded) side of the gap information network. The screen grid 77b of the tube 77 is maintained positive with respect to its cathode by an ungrounded voltage source 79 between these electrodes. Capacitor 80 between the screen grid and the cathode and the series screen grid resistor 81 play their conventional role in maintaining the screen grid potential.

To energize the pilot pulse generator 76 a pilot trigger pulse source 81 is coupled between the control grid 77a and the cathode. Such a pulse source preferably provides squared pulses of an adjustable duration at an adjustable repetition rate which are amplified by the pulse generator and supplied to the gap information network.

The signal voltage appearing across resistor 72 is suitably amplified by a conventionally represented amplifier 82 and injected in the grid circuit of the power pulse control circuit switch 68. As shown in the drawing, a saturable core transformer 83 has its primary winding coupled to the amplifier output terminals and its secondary winding coupled to a grid resistor 84 and a bias source 85 across the grid 68a and cathode of the tube 68. An electrode feed control system (not shown) suitably corresponds to that of Fig. 2.

*Operation of the apparatus of Fig. 8*

An appreciation of the operation of Fig. 8 may be gained by reference to Figs. 9, 10, and 11 representing the open circuit, normal cutting, and short circuit gap spacings respectively. Parts A, B, and C of each figure respectively portray the gap voltage, gap current, and information signal. These correspond to a large extent with Figs. 3, 4, and 5 which deal with the apparatus of Fig. 2, but they also illustrate further the scope of the method of operation as well as certain advantages of the square wave pilot pulse.

As portrayed in Figs. 9A, 10A and 11A, a square wave voltage pulse $V_{76}$ in dotted outline is generated by the pilot pulse generator 76 when the control grid 77a is driven to saturation. The amplitude of this pulse may be several hundred volts, more than desired in some cases if the pilot pulse is to narrowly restrict the width of the gap for normal cutting. However, by adjusting the pilot pulse duration or width, such as is readily possible with the low-power square wave generating apparatus described, the voltage actually applied across the gap need not reach the full open-circuit voltage $V_{76}$ of the pulse generator before the pulse starting at $t_0$ is terminated at $t_t$.

Thus as shown in Fig. 9A, representing open circuit conditions, the voltage $V_g$ across the gap rises not vertically from time $t_0$ but exponentially, due to the charging of the gap capacitor 71. This gap voltage $V_g$ may be assumed to correspond very closely to the voltage across the gap resistor 70, the isolating and damping elements 73, 74, and 75 involving no appreciable voltage drop under these conditions. At time $t_t$ therefore, the exponential rise, almost linear during the early part of the charging time for the capacitor 71, ends at a voltage which may be predetermined say, for example, in the vicinity of 100 volts even though $V_{76}$ may have a maximum no-current amplitude of 400 volts. After time $t_t$ the voltage decays gradually as the capacitor 71 discharges through the combined resistance values of resistors 70 and 72.

By way of example, the following set of values employed in an apparatus of the type shown in Fig. 8 illustrates the charge and discharge time constants for capacitor 71:

Resistor 70 _____ohms__ 2000
Capacitor 71 _____microfarads__ .05
Resistor 72 _____ohms__ 100
Resistor 73 _____do____ 25

Since the plate resistance $r_p$ of the pulse generator 76 increases with the voltage across the tube or tubes 77, its value changes during the charging of the capacitor 71. Simplifying the calculation by assuming an initial fixed $r_p$ value in the vicinity of 500 ohms, the charging time constant may be expressed:

$$T_{charge} = (r_p + R_{72})C_{71} = 30 \text{ microseconds}$$

The discharge time constant during open circuit would be:

$$T_{discharge} = (R_{70} + R_{72})C_{71} = 105 \text{ microseconds}$$

Thus to prevent the voltage across the gap from rising above 100 volts with 400 volts on the pulse generator, the pulse duration is adjusted to be appreciably less than $T_{charge}$—around 7 microseconds. The actual value departs somewhat from this figure due to the fact that $r_p$ is not constant.

During the open circuit condition of Fig. 9A there is no gap current $i_g$ as indicated in Fig. 9B. As shown in Fig. 9C, a charging and discharging current $i_{71}$ is associated with the capacitor 71. With the polarity represented, the charging current is above the horizontal axis in Fig. 9C and reverses direction at time $t_f$ to discharge at a slow rate as shown by the portion of the curve below the horizontal axis. The discharge time constant should be less than the time between pilot pulses.

The gap information signal appearing across the charging resistor 72 corresponds, as $V_{72}$, to the current curve $i_{71}$ in Fig. 9C and is of insufficient magnitude during open circuit to generate a switching or trigger signal in the grid circuit of switch 68. Again, the switching polarity must be that portion of the voltage curve which is negative-going below the horizontal axis.

Fig. 10 illustrates the normal cutting corresponding largely to Fig. 4. As shown in Fig. 10A sparkover occurs at time $t_s$ whereupon the capacitor 71 discharges through resistor 72, rectifier 74, resistor 73 and the spark gap itself. With only a small voltage drop encountered in the resistor 73 and rectifier 74, a very sudden discharge occurs. Under these circumstances, as shown in Fig. 10C, an appreciable triggering signal is generated starting at time $t_s$ and the switch 68 is closed to release a high current power pulse represented by the gap current $i_g$ in Fig. 10B.

In the event of short circuit, there is no gap voltage $V_g$ as shown in Fig. 11A. The gap current under such circumstances is limited to that provided by the pilot pulse as limited by the pulse generator plate resistance (plus the small value of resistor 73). Under such circumstances the information signal is also nil because there is very little voltage across the gap information network.

It will be appreciated that the square wave pilot pulse frees the designer and operator from the limitations imposed by a sinusoidally decreasing pilot voltage during the latter half of the pilot pulse. However, the full pilot pulse generator voltage, at whatever voltage is selected, may be applied to the gap; either the pilot pulse duration or the pilot pulse generator voltage may be employed to limit the maximum pilot voltage which can appear across the gap.

The apparatus of Fig. 12

In installations where further precautions against malfunctioning of the circuit of the gap information network are economically justified, further modifications may be incorporated for preventing false or accidental triggering of the power pulse switch during the intervals between pilot pulses. Fig. 12 illustrates a modification of Fig. 8 directed to that end. For clarity of description Fig. 12 does not repeat all of the features of Fig. 8, but only those which are needed for showing the additional circuit structure and its relation to the apparatus of Fig. 8. The added circuit elements of Fig. 12 amplify the disclosure of the pilot trigger pulse source 81 of Fig. 8 and the amplifier 82 across the gap network resistor 72.

Looking generally to Fig. 12, it may be seen that an impulse train from a low power source 90 is supplied to each of two multivibrator stages or circuits 91 and 92. Each of these multivibrators is of the monostable or one-shot type in which a negative-going trigger impulse provides an amplified positive-going output pulse of predetermined amplitude. The output pulses of the first multivibrator 91 are amplified in buffer-amplifier 93 and applied to the input circuit of the pilot pulse generator 76 previously described in connection with Fig. 8.

The gap G and information network to which the pilot pulses are supplied is that of Fig. 8. The second multivibrator 92 has its output pulses connected to a gating amplifier 94. Voltage signals from the gap resistor 72 are also supplied to the gate, and if they occur simultaneously with the pulses from the second multivibrator 92, the gate is opened and an output pulse is generated. This output pulse is supplied to amplifier 82 of Fig. 8 to be ultimately induced in the control circuit of the power pulse switch 68 for initiating the power pulse.

While the structure of the particular multivibrator stages 91 and 92 shown here is not in itself a part of the present invention, their description is briefly set forth for an appreciation of their selection and function as part of the overall apparatus. Of particular concern is the pulse width control whereby the duration of the pulse is adjusted with respect to its initiation by a trigger signal.

Looking to stage 91 as exemplary, two triode vacuum tubes 95 and 96 are connected through an appropriate resistor network to a positive voltage bus 97 and a negative voltage bus 98. Separate anode resistors 99 and 100 are employed for the respective first and second triodes 95 and 96 while a single cathode resistor 101 is common to both triodes. The grid or control electrode of the first triode is coupled to the anode of the second triode through a capacitor 102, and since this is a one-shot or monostable multivibrator, the grid of the second triode is not correspondingly coupled but is instead connected directly to the negative bus. With the first triode normally conducting, current is drawn through resistors 99 and 101 as well as the plate resistance of the tube 95. Upon application of a negative-going trigger signal from the source 90 to the grid of the first tube 95 the tube is rendered non-conductive and its potential immediately rises to initiate the output pulse. At the same instant the second tube 96, normally cut off, is rendered conductive since the absence of a voltage drop across the cathode resistor 101 makes the grid of the second tube 96 less negative with respect to its cathode. The immediate drop of anode voltage of the second tube 96 tends, through capacitor 102, to keep the grid of the first tube negative. To terminate the pulse a voltage dividing resistor 103 applies a selected positive voltage through an adjustable tap to the grid of the first tube 95 and eventually restores the tube to its conducting state. This action is delayed, however, by the time required to charge the capacitor 102. The time constant of the RC circuit represented by the capacitance of element 102 and the combined resistance of that part of voltage divider 103 between positive bus 97 and the resistor tap, the plate resistance of the second tube 96, and the common cathode resistor 101 determines the delay. Thus it will be seen that by adjustment of the tap on resistor 103 the input trigger pulses are adjustably stretched. An output terminal for the stage is located either at the anode of the first tube 95 or at a point on its anode resistor 99 to provide positive-going pulses to the input stage of the buffer amplifier 93. The second stage 92 is similarly constructed and its pulse duration or width is desirably separately adjustable with respect to stage 91 for versatility of control.

Turning now to the gate or gating amplifier 94 a pentode or other multigrid vacuum tube 105 having two control grids is suitably employed. As shown, the signal applied between its cathode and first grid is the voltage appearing across resistor 72 of the gap information network, upon application of an amplified pulse from the first multivibrator 91. A second signal applied between its cathode and second grid is the pulse from the second multivibrator stage 92. Only to the extent that the signals applied to the two grids coincide in time can the gate tube 105 conduct. Its anode output is coupled to the power pulse switch control circuit.

In operation it will be appreciated that spurious voltages occurring in the intervals between pilot pulses cannot trigger the power pulse switch. The sensitivity of the information network itself may thus be more fully realized and the pilot pulse short circuit current may be limited to very low levels. Closer control can also be obtained by shortening the gating pulses with respect to the pilot pulses making the control signal derivation from the pilot pulse independent of the duration of the pilot pulse itself and dependent instead upon the operation of the gate.

*Apparatus of Fig. 13*

A still further modification of the apparatus of Figs. 8 and 12 is shown in Fig. 13, largely in the form of block diagrams since the elements making up the combination are of well known design or previously explained. The Fig. 13 apparatus, as will be seen from its description, permits the use of separate pilot pulses for the power pulse switching and electrode feed control. In the particular system illustrated alternate ones of a train of pilot pulses are selected for the respective switch and feed control functions, and for convenience of reference these are respectively termed A and B pulses.

A suitable initial timing source for the pilot pulses is a low-power sine wave oscillator 110 adjustable over the audio frequency range. The generated sine wave signal is suitably amplified in an amplifier 111, squared in a wave squaring circuit 112 and differentiated by a differentiating circuit 113. The positive-going output pulses or trigger impulses at this point are represented as A pulses and the negative-going ones as B pulses. In a pulse amplifier 114, the A pulses are amplified and supplied as the input signal to multivibrators 115 and 116. Both are suitably of the one-shot adjustable pulse width construction illustrated in connection with the apparatus of Fig. 12. The output signal of pulse amplifier 114 is also supplied to an inverter amplifier 117 which amplifies the B pulses and eliminates the A pulses. The output signal from this amplifier is supplied to multivibrator stages 118 and 119 of a construction similar to those previously described.

The output signals from the first A pulse multivibrator 115 and the first B pulse multivibrator 118 are recombined in the common input circuit of a trigger pulse amplifier 120 as a train of evenly spaced A and B pulses of like polarity. The output of this amplifier is in turn supplied to the pulse amplifier stage 76 previously described and injected in the gap information network comprising elements 70, 71, 72, and the spark gap G, as previously described.

The gap information network responses to A and B signals are separated so that they may perform their separate functions. As shown, the signal voltage appearing across resistor 72 is supplied to the A signal gating amplifier 120. The other signal to this gate is from a second A pulse multivibrator 116 so that an amplified output signal is supplied only during the time of the applied A pulses to the power switch control circuit. The voltage appearing across the gap resistor 70 is supplied to the B signal gating amplifier 122 as are the signals from the second B pulse multivibrator 119. The output signal is supplied to an electrode feed control circuit suitably the type previously described as free of any extraneous signals, particularly induced voltages tending to appear in the circuit as a result of the high current power pulse discharges.

The division of pulses for the two functions may be variously arranged of course, it being usually desirable to avoid taking any time for separate feed control pulses which would cut down the repetition rate of the power switch. However, due to the ease with which low power pilot pulses may be generated as compared with the problem of high frequency switching at the power pulse level, one or more "feeler" pulses for gap spacing control can usually be conveniently scheduled after each regular or power switch control pilot pulse.

We claim as our invention:

1. The method of spark machining by a series of short, high-current, time-spaced material dislodging electrical discharges through an ionizable spark gap defined between a conductive workpiece and an electrode tool which comprises repetitively applying a series of relatively low power pulses to the spark gap, detecting the ionization of the spark gap when the gap is neither short circuited nor too widely spaced for sparkover to occur upon application of said low power pulses, and switching a high voltage power source across the gap instantaneously upon detection of ionization of the gap resulting from sparkover.

2. In the art of spark machining by high current discharges through a spark gap defined between a conductive workpiece and an electrode tool in which the gap is filled with an ionizable self-restoring dielectric fluid which ionizes upon application of a sufficient sparkover voltage, the steps of repetitively applying a voltage pulse across the spark gap to cause sparkover when the gap spacing is not short circuited nor excessively wide, detecting the presence of ionization of the gap accompanying sparkover, and instantaneously releasing a high-current discharge across the gap when ionization is detected.

3. In the art of spark machining by high current discharges through a spark gap defined between a conductive workpiece and an electrode tool in which the gap ionizes upon application of a sparkover voltage, the repetitive steps of charging a storage capacitor to a relatively high voltage, applying a relatively low voltage pulse across the spark gap to cause sparkover when the gap spacing is neither short circuited nor excessively wide, and instantaneously connecting the storage capacitor across the gap when sparkover occurs.

4. In the art of spark machining by high current discharges through an ionizable spark gap defined between a conductive workpiece and an electrode tool, the repetitive steps of applying a voltage pulse across the spark gap through a current-limiting impedance to cause sparkover when the gap spacing is neither short circuited nor excessively wide, and bypassing the current-limiting impedance instantaneously upon occurrence of sparkover.

5. In the art of spark machining by high current discharges through an ionizable spark gap defined between a conductive workpiece and an electrode tool, the repetitive steps of charging a storage capacitor to a relatively high voltage, connecting the storage capacitor across the gap only after ionization of the gap, and applying a pulse of given voltage from a low power source to ionize the gap by sparkover occurring at said given voltage when the gap spacing is intermediate short-circuit and open-circuit limits.

6. In the art of spark machining by high current discharges through an ionizable spark gap defined between a conductive workpiece and an electrode tool, the steps of applying a series of relatively low voltage pulses across the spark gap to initiate a low current discharge by sparkover when the gap spacing is neither short circuited nor excessively wide with respect to said relatively low voltage, sensing the ionization of the gap accompanying sparkover, instantaneously releasing a high-current discharge across the gap when such ionization is detected, and simultaneously sensing the average gap voltage provided by said low voltage pulses, and controlling the average gap spacing in response to the said average gap voltage.

7. In the art of spark machining by high current discharges through an ionizable spark gap defined between a conductive workpiece and an electrode tool, the steps of applying a series of relatively low voltage pulses across the spark gap to spark over the gap when the gap spacing is neither short circuited nor excessively wide, sensing the ionization accompanying sparkover of preselected ones of said pulses, instantaneously releasing a high-current discharge across the gap when such ionization is detected, detecting the average gap voltage of selected other ones of said pulses, and controlling the average gap spacing in response to the said average gap voltage.

8. In a spark machining apparatus for dislodging particles from a conductive workpiece by a series of short, high-current time-spaced discharges in an ionizable spark gap defined between the workpiece and the electrode tool, means for maintaining the spark gap at a desired spacing corresponding to a given gap voltage range within which sparkover occurs, a pilot pulse voltage source connected across the gap for supplying time-spaced voltages thereto within said voltage range, a power pulse voltage source having a voltage higher than said given voltage range and a normally open switch connected in series across the gap, and a capacitor-resistance network connected across the gap for providing a switch-closing signal in response to the change in gap voltage occurring upon ionization of the gap by pilot pulse sparkover, said normally open switch having means responsive to the presence of said signal for closing the switch.

9. In a spark machining apparatus having a conductive workpiece and an electrode tool defining an ionizable spark gap between them, a power source, a switch, means connecting said power source across said spark gap through said switch for providing a high-current workpiece-particle-dislodging spark discharge when the switch is closed, a source of relatively low power pilot impulses also connected across said spark gap, means responsive to ionization of the spark gap for providing a signal voltage upon the occurrence of a sparkover discharge during the application of a pilot pulse, and means responsive to the presence of said signal voltage to close said power switch.

10. In a spark machining apparatus for dislodging particles from a conductive workpiece by a series of short, high-current time-spaced discharges through the ionizable dielectric fluid-filled spark gap defined between the workpiece and an electrode tool; means for connecting a high voltage power source to the gap; and means for preventing current flow in the event the gap is short circuited comprising a normally open switch connected in circuit between the power supply and the gap, means for providing a train of time-spaced low voltage pulses to the gap, means responsive to the ionization of the gap by a low voltage impulse sparkover for producing a control signal, and means responsive to the control signal to close said power switch.

11. In a spark machining apparatus having a conductive workpiece and an electrode tool defining an ionizable spark gap between them, a capacitor, means for charging the capacitor, means including a normally open switch for connecting said capacitor across the gap for providing high current discharges therethrough when the switch is closed, a source of pilot pulses of given voltage including current limiting resistance, means for connecting said source of pilot pulses across the gap for providing low current discharges therethrough when the gap spacing is sufficiently small to permit ionization by sparkover discharge, means responsive only to the ionization of the gap upon sparkover for generating a control signal, and means responsive to the control signal for instantaneously closing said switch.

12. In a spark machining apparatus having a conductive workpiece and an electrode tool defining an ionizable spark gap between them, a first source of voltage impulses, means including a normally open switch for connecting said first source across the gap for providing a high current discharge through the gap when the switch is closed, a second source of voltage impulses, means including a current limiting resistance for connecting said source across the gap for providing low current discharges when the gap spacing is sufficiently small to permit ionization by sparkover discharge, means responsive to the ionization of the gap upon sparkover for generating a control signal, and means responsive to the control signal for instantaneously closing said switch to release a high current discharge through the gap.

13. In a spark machining apparatus having a conductive workpiece and an electrode tool defining an ionizable spark gap between them for supporting a high-current discharge upon ionization, a source of voltage impulses, a normally open switch, a discharge circuit for connecting said source across the gap when the switch is closed, current-limiting means shunting said switch for providing low current discharges across the gap when the gap spacing is sufficiently small to permit sparkover, means responsive to the abrupt decrease of gap voltage upon ionization following sparkover for generating a control signal, and means responsive to the control signal for instantaneously closing said switch to release a high current discharge through the gap.

14. In a spark machining apparatus for dislodging particles from a conductive workpiece by a series of short, high-current time-spaced discharges across an ionizable spark gap defined between the workpiece and the electrode tool, a pilot pulse voltage source connected across the gap for supplying a train of time-spaced pilot voltage impulses within a given voltage range causing sparkover at the desired gap spacing, a power pulse voltage source having a voltage higher than said given voltage range, and a normally open switch connected in series across the gap, and a capacitor-resistance network connected across the gap for providing a switch-closing signal in response to the abrupt change in gap voltage occurring upon ionization of the gap by each pilot pulse sparkover, said normally open switch being responsive to the presence of said signal to release a power pulse discharge through the gap, and drive means responsive to the average gap voltage for maintaining the said desired spark gap spacing.

15. In a spark machining apparatus for dislodging particles from a conductive workpiece by a series of short, high-current time-spaced discharges, an ionizable spark gap defined between the workpiece and the electrode tool for supporting high current discharges, a pilot pulse voltage source connected across the gap for supplying a train of time-spaced pilot pulses, said pilot pulses having a voltage sufficient to spark over the gap at the desired gap spacing range, a power pulse voltage source having a voltage higher than the pilot pulse voltage, a normally open switch connected in series with said power pulse voltage source across the gap, means responsive to the abrupt ionization of the gap by sparkover of each of selected ones of said pilot pulse train for closing said normally open switch, and means responsive to the averaged gap voltage of selected other ones of said pilot pulse train for maintaining the desired gap spacing.

16. In a spark machining apparatus for dislodging particles from a conductive workpiece by a series of short, high-current time-speaced discharges through an ionizable spark gap defined between the workpiece and an electrode tool, means for connecting a high voltage power source to the gap; and means for preventing high current flow in the event the gap is short-circuited comprising a normally open discharge device switch connected in circuit between the power supply and the gap, said switch having a control circuit, means for providing a train of relatively low voltage pilot pulses, and means responsive only to the ionization of the gap upon pilot pulse sparkover for instantaneously closing said power switch, said lastnamed means comprising a gap capacitor and a first resistor connected in series across the gap for charging the capacitor upon the application of a pilot pulse, a second resistor shunting the gap for relatively slowly discharging the capacitor in series with the first resistor in the event the gap is not ionized, and means for applying the voltage appearing across the first resistor upon relatively fast discharge of the capacitor through the first resistor and the ionized gap to the control circuit of said switch.

17. In a spark machining apparatus for dislodging particles from a conductive workpiece by a series of short, high-current time-spaced discharges through an ionizable spark gap defined between the workpiece and an electrode tool, means for connecting a high voltage power pulse source to the gap; a normally open discharge device switch connected in circuit between the power pulse source and the gap, said switch having a control circuit; means for applying a train of relatively low voltage pilot pulses across the gap; means for generating a signal upon ionization of the gap attending each pilot pulse sparkover, said lastnamed means comprising a gap capacitor and a first resistor connected in series across the gap, and a second resistor having a resistance several times that of said first resistor also connected across the gap, said capacitor being charged upon application of a pilot pulse through said first resistor and being discharged relatively slowly through said first and second resistors unless the gap is ionized; and means for applying as the control signal the discharge current voltage drop appearing across the first resistor to the control circuit of said switch.

18. In a spark machining apparatus having a switch for repetitively supplying short, time-spaced high current pulses through an ionizable spark gap defined between a conductive workpiece and an electrode tool to dislodge workpiece particles, means for providing a control signal closing the switch in accordance with the spacing of the gap intermediate short-circuit and open-circuit conditions upon application of a given voltage, said means comprising means for applying a train of time spaced pilot pulses of said given voltage, a capacitor connected across the gap for receiving a charge upon application of a pilot pulse across the gap in the event the gap is not short circuited, and means responsive to the rapid discharge of the gap capacitor through the gap in the event the gap is ionized by pilot pulse sparkover for generating a switch control signal, and a resistance shunting the gap for slowly discharging the gap capacitor in the event the gap spacing is too wide for sparkover to occur.

19. In a spark machining circuit means for applying a train of pilot pulses of given voltage to an ionizable spark gap defined between a conductve workpiece and an electrode tool, a source of high-current power pulses coupled through a normally open switch to the spark gap, and means for closing said switch only for gap spacings intermediate short circuit and open circuit conditions at said given pilot pulse voltage comprising a gap capacitor and signal resistor connected in series across the gap for charging the gap capacitor in the absence of a gap short circuit upon application of each pilot pulse, a second resistor connected across the gap and having a resistance value many times higher than that of the gap in its ionized state for discharging the gap capacitor slowly in the absence of pilot pulse sparkover, and means for applying the voltage drop appearing across the first resistor upon rapid discharge of the gap capacitor during sparkover as the control signal for said switch.

References Cited in the file of this patent
UNITED STATES PATENTS

| | | |
|---|---|---|
| 2,186,013 | Edgerton | Jan. 9, 1940 |
| 2,294,498 | Heindlhofer | Sept. 1, 1942 |
| 2,363,332 | Jennings | Nov. 21, 1944 |
| 2,478,907 | Edgerton | Aug. 16, 1949 |
| 2,589,720 | McMath | Mar. 18, 1952 |
| 2,804,575 | Matulaitis | Aug. 27, 1957 |
| 2,856,565 | Matulaitis | Oct. 14, 1958 |